United States Patent [19]

Parkinson et al.

[11] 4,432,778
[45] Feb. 21, 1984

[54] FLUIDIC SWITCHED FLUID CLEANING

[75] Inventors: Michael J. Parkinson; Anthony W. Jury, both of Tewkesbury, England; Nicholas Syred, Llenishen; Ieuan Owen, Pentwyn, both of Wales

[73] Assignee: Coal Industry (Patents) Limited, London, England

[21] Appl. No.: 478,029

[22] Filed: Mar. 23, 1983

Related U.S. Application Data

[63] Continuation of Ser. No. 227,487, Jan. 22, 1981, abandoned.

[30] Foreign Application Priority Data

Feb. 8, 1980 [GB] United Kingdom ................. 8004245

[51] Int. Cl.³ ............................................. B01D 46/44
[52] U.S. Cl. ....................................... 55/212; 55/284; 55/302
[58] Field of Search ................. 55/212, 213, 283, 284, 55/288, 302, 344; 210/512.2, 512.3

[56] References Cited

U.S. PATENT DOCUMENTS

| | | | |
|---|---|---|---|
| 3,457,787 | 7/1969 | Maatsch et al. | 55/302 X |
| 4,077,781 | 3/1978 | Sundstrom | 55/302 X |
| 4,203,736 | 5/1980 | Beaz | 55/288 X |
| 4,260,563 | 4/1981 | Brulhet | 55/344 |

FOREIGN PATENT DOCUMENTS

| | | |
|---|---|---|
| 1128912 | of 0000 | United Kingdom . |
| 1262874 | of 0000 | United Kingdom . |
| 2007530 | of 0000 | United Kingdom . |
| 1433873 | of 0000 | United Kingdom . |
| 792800 | 6/1955 | United Kingdom . |
| 1002151 | 8/1965 | United Kingdom . |
| 1132431 | 11/1965 | United Kingdom . |
| 1125613 | 2/1966 | United Kingdom . |
| 1178701 | 1/1967 | United Kingdom . |
| 1256508 | 12/1971 | United Kingdom . |
| 1423188 | 10/1973 | United Kingdom . |
| 1471606 | 6/1974 | United Kingdom . |

Primary Examiner—John Adee
Attorney, Agent, or Firm—Stevens, Davis, Miller & Mosher

[57] ABSTRACT

The present invention provides a fluid cleaning system, especially designed for removing particulate contaminants from a hot gas, comprising at least two parallel lines for receiving contaminated fluid. Each line includes a collector (5), a collector cleaning means (8), and a vortex amplifier (6). The vortex amplifiers are used in place of mechanical valves to control the system by opening and closing their respective lines. Each cleaning means (8) can only operate when its line is closed.

9 Claims, 7 Drawing Figures

FLUIDIC SWITCHED FLUID CLEANING

This is a continuation of application Ser. No. 227,487 filed Jan. 22, 1981, now abandoned.

This invention relates to a fluid cleaning system controlled by use of fluidic devices, in particular vortex amplifiers. It is envisaged that the invention will be particularly, but not exclusively, useful in the cleaning of hot gases contaminated with erosive and/or corrosive particulate material.

It is envisaged that in a power plant solid fuel such as coal will be gasified to produce a combustible fuel gas, generally of low calorific value, which will be burned in a combustion stage. The gaseous products of combustion will then be passed to a gas turbine for expansion. It is also envisaged that a solid fuel such as coal will be burnt to produce combustion gases which will be passed to a gas turbine for expansion.

The solid fuel may be converted to combustion gases, either directly or via a fuel gas, by treatment in fluidised bed combustor or gasifier by methods which are already well known in the art.

The fuel gas or combustion gas, as well as containing desired gaseous components, such as carbon oxides, hydrogen, steam, methane and nitrogen or carbon oxides, oxygen and nitrogen respectively, will also contain contaminants which are entrained in the gases during their production. The contaminants may be solids or liquids, the latter generally being present in the form of aerosols. The contaminants include unburnt or ungasified solid fuel, coke, limestone or dolomite particles, tar, hydrocarbons, fly ash and alkali metal compounds. The majority of the solid contaminants may be removed by use of one or a series of cyclone separators. However, the aerosols and some particulate contaminants, especially those having a particle size of less than about 10 $\mu$m, are not completely removed by cyclone separators. If the particulate contaminants or the aerosols of alkali metal compounds are fed to a gas turbine for expansion they will cause fouling, erosion and corrosion of the turbine, especially of its blading.

It has therefore been proposed to complete the cleaning of a contaminated gas before it is fed to a gas turbine for expansion by passing it through a particle collector, such as a fibre or granular bed filter or an electrostatic precipitator. However, since these type of collectors collect the contaminants it is necessary to clean the collecting areas at regular intervals to prevent the collector from acting inefficiently. To be able to do this it is necessary to interrupt the flow of contaminated gas to the collector, and to pass the gas to another similar collector to keep a continuous flow of gas. When low temperature gases are to be cleaned it is possible to switch the flow of contaminated gas by use of mechanical valves. However with contaminated fuel gases or combustion gases, which emerge from their production stage at temperatures in the region of 1000° C., this is not practicable, because the mechanical valves themselves become eroded and corroded and may also be fouled by the contaminants. It is preferred to clean the gases without degrading their sensible heat so that the efficiency of the process is maximised.

It has been proposed to effect cleaning of a fluid, such as petrol, by passing it through two parallel filters and switching between the filters using Coanda switches. These switches work relatively well for systems with small pressure drops across them, but are not easily controlled and are ineffective where the pressure drop across the system is large. Such systems are described in, for instance. British Pat. Nos. 1,433,873, 1,262,874, 1,178,701, 1,132,431, 1,128,912 and 1,125,613.

It is therefore an object of the present invention to provide a gas cleaning system using a particle collector which system is controlled by fluidic devices, thereby obviating at least in part the problems associated with the use of mechanically controlled systems at high temperatures, and which can operate with a high pressure drop across the system.

According to the present invention, there is provided a fluid cleaning system for producing a contaminant-free fluid, comprising at least two parallel fluid lines for receiving contaminated fluid, each line including a particle collector for collecting the contaminants, a collector cleaning means and a vortex amplifier operable to open and close its line, each collector cleaning means being operable only when its line is closed. The vortex amplifier may be located either upstream or downstream of the collector. If it is located upstream of the collector it has the advantages that less control fluid is used to close the line than would be the case with a downstream vortex amplifier, and that the vortex amplifier may be designed to act as a cyclone particle separator when it is open, thus reducing the need for some of the upstream cleaning stages. However the disadvantage of having the vortex amplifier upstream of the collector is that it is contacted by hot particle-laden gases and may therefore become clogged and/or eroded, thus reducing its efficiency.

If the vortex amplifier is located downstream of the collector it will not be affected by hot particulate material, but it will require more control fluid than would a similar amplifier upstream of the collector.

A normal vortex amplifier comprises a thin generally cylindrical chamber having at least one radial or axial inlet, an axial outlet and at least one tangential inlet. When no control fluid is fed through the or each tangential inlet, contaminant-free fluid can flow from the or each other inlet to the axial outlet with little resistance. However, if control fluid at high pressure is fed into the or each tangential inlet, it causes the contaminant-free fluid to be entrained in a vortical flow, which generates a Rankine-type vortex (i.e., free/forced vortex combinations) across the chamber. Associated with this vortex is a very high radial/centrifugal pressure gradient which impedes the contaminant-free fluid from leaving the amplifier through the axial outlet. The vortex amplifier thus acts as a valve.

The vortex amplifier may also be a turn-up vortex amplifier. In this case the amplifier has two opposed tangential inlets. In normal use control fluid is fed into one tangential inlet, thus closing the amplifier. To open the amplifier, control fluid is fed into the second tangential outlet to nullify the vortex.

In general it will take longer to collect enough material on the collector to reduce its efficiency than it will to clean it. For instance it may take 5 to 10 times longer to collect the material than it takes to clean the collector. Thus for most of the time all lines are open and it is preferable to stagger the closing of the lines. Preferably there are at least four and up to about six lines in the system, and their operation is so controlled that at any one time only one line is closed. This has the advantage that the amount of control fluid used relative to the amount of fluid flowing in the whole system is low. This means for instance that the amount of sensible heat lost from a product gas will be also low. The dilution of the product is reduced by a factor of $\sqrt{N-1}$ where N is the number of parallel lines. However, practical considerations will limit the number of lines to be used.

Other advantages of the system according to the present invention are that the vortex amplifiers can easily handle hot fluids without the same problems as are presented with mechanical valves at high temperatures. Thus the sensible heat of the system is not degraded significantly and the system efficiency is maximised. Moreover, if the vortex amplifiers are located downstream of the collector, during a cleaning operation on a collector any particulate material which is re-entrained in the fluid will pass directly to an operative collector and be recollected. The re-entrained particles will not pass through the vortex amplifier and there will not be any problems due to corrosion, erosion or fouling of the amplifiers.

A further advantage of the system according to the present invention is that the pressure drop across one collector can be large without affecting the switching. If a Coanda switch were used, the switch would flip at relatively low pressure, and at high pressure would stay permanently in one direction. With a vortex amplifier the switching is controlled solely by the control fluid being fed to the vortex amplifier, thus enabling the flow of fluid to be controlled over a wide range of operating conditions.

The control fluid may be any suitable gas, steam or water, supplied at high pressure. For instance, it a fuel gas is being cleaned, the control fluid must be an inert gas, and for this purpose nitrogen is suitable. However, dilution of a fuel gas with an inert gas would lower its calorific value and make it less suitable for combustion in a gas turbine. It is therefore preferred that at least a part of the control gas is contaminant-free product gas which has been pressurised or entrained in a high pressure flow. This may be achieved by use of an ejector, which comprises, generally, a high pressure fluid jet surrounded by a fluid inlet. As the high pressure fluid emerges from the jet, it entrains therein low pressure fluid from the fluid inlet. If the low pressure fluid is the contaminant-free gas and the high pressure gas is nitrogen or another inert gas, it is possible to produce a control gas comprising up to 70% or more contaminant-free gas.

In a preferred embodiment the or each tangential inlet on the vortex amplifiers is connected to a double ejector such that when one of the amplifiers is operating, the contaminant-free product gas is being drawn from the tangential inlets of an other vortex amplifier. The double ejector is fed from a single source of pressurised inert gas, such as nitrogen.

The particle collector may be an electrostatic precipitator which is cleaned in known manner by rapping, or a fibre filter or granular bed filter cleaned by blowing gas back through the filter. The gas is usually blown back through the filter in a sharp burst which discharges the particles from the filter material. Such a high pressure burst of gas would disrupt the action of a Coanda device but has no appreciable effect on a vortex amplifier. The particles then fall off the filter into a hopper, which will be a lock hopper where high pressure or temperature gases are used. In the case of a granular bed filter it is also possible to take out some of the bed material from the filter with the contaminants thereon. The bed material may then be separated from the contaminants, for instance by sieving, and returned to the bed. A preferred type of collector is a Squires or panel bed filter.

The present invention will now be more particularly described, by way of example only, with reference to the accompanying drawings, in which.

Figure 1:
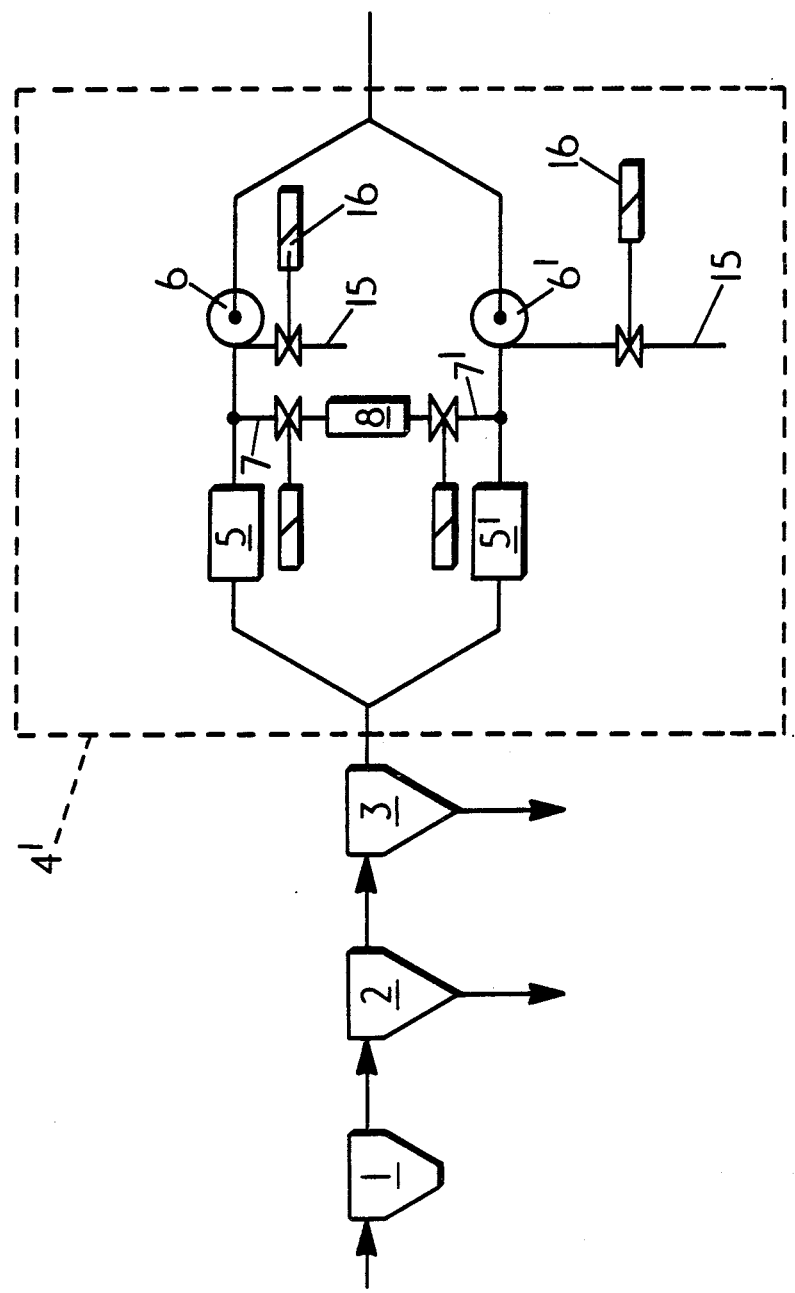
FIG. 1 shows diagrammatically a first embodiment of the invention in which only two parallel collector lines are shown.

A first embodiment of the invention is described with reference to FIGS. 1 and 4. Coal is burnt in a fluidised bed combustor 1 operated under pressure. Combustion gases are produced at a pressure of about $2 \times 10^6$ pascals and a temperature of about 900° C. They contain about 412 g/m$^3{}_{af}$ of particulate contaminants (af denotes 'actual fuel' gas conditions). The combustion gases are passed through two cyclone separators 2, 3 wherein most of the particulate contaminants are removed. However, the combustion gases exhausting from the cyclone separators will contain up to 8.2 g/m$^3{}_{af}$ of particulate contaminants, most of which are less than 10 μm in size. The combustion gases are therefore fed to the cleaning system shown at 4. This comprises two gas lines each having in them a panel bed filter 5 or 5' and a vortex amplifier 6 or 6' downstream of the filter 5 or 5'. The filters 5, 5' are cleaned by means of puff back gas supplies 7 or 7', which may be supplied from the same source 8. The puff back gas is nitrogen or another inert gas.

Figure 5:
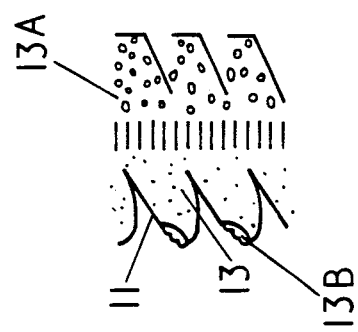
FIG. 5 shows a sectional view along line A—A of FIG. 4.
Figure 4:
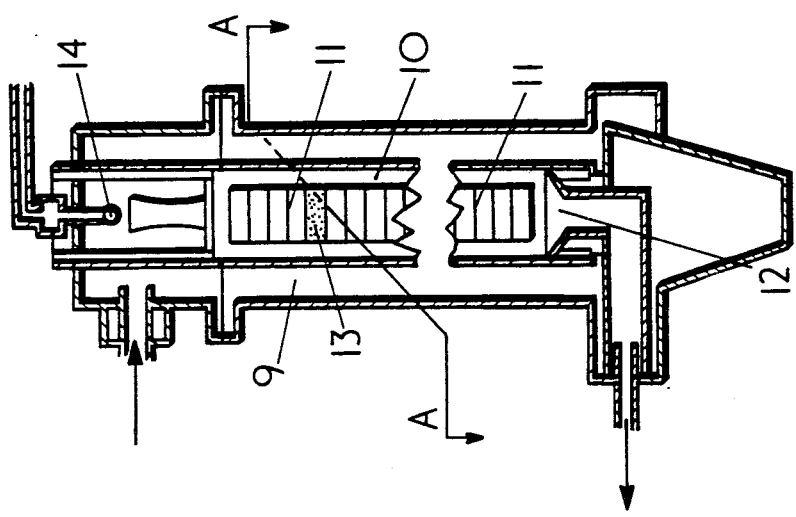
FIG. 4 shows a Squires or panel bed filter.

A panel bed filter is shown in more detail in FIG. 4. It comprises an outer chamber 9 into which combustion gases are fed, a middle chamber 10 in which are located a series of slats 11 and a central chamber 12 from which the contaminant-free gas exhausts. The slats 11 shown in FIG. 5, to which reference is now made, support beds of fine sand 13 and coarse sand 13a which trap the contaminants 13b, both particulate and aerosol, of the combustion gases. At the top of the filter is a puff-back valve 14.

The vortex amplifiers 6, 6' are supplied with control gas from a source 15 which supplies pressurised nitrogen or other inert gas to the tangential inlets.

The vortex amplifier is to be active when the filter in one of the parallel lines requires cleaning. All, or in this case, both lines would operate normally without control gas (to minimise the use of control gas). Each filter would need to be able to take the whole of the flow.

In use, contaminated gas is fed to the system, and one of the vortex amplifiers 6 is operated by supplying to it control gas. This prevents any of the contaminated gas from flowing in that line. The other vortex amplifier 6' is not operated and so contaminated gas flows through that line into the filter 5' where the contaminants are collected on the sand particles 13. When the filter 5' which is operating begins to act inefficiently or after a set time, the vortex amplifier 6' in its line is activated and the other vortex amplifier 6 is deactivated. This may be achieved by use of a normal mechanical valve 16 since the control gas is neither hot nor contaminated.

The contaminated gas therefore flows in the other line and the contaminants are collected in the other filter 5.

The first filter 5' is cleaned by opening the puff back valve and allowing a blast of nitrogen to enter the central chamber. Since the normal exit is blocked by the action of the vortex amplifier 6' the gas is directed through the bed and dislodges the collected contaminant particles. It also dislodges a proportion of the sand 13 which falls together with the contaminant particles into a lock hopper (not shown) below the filter 5'. The sand bed 13 may then be replenished to make the filter 5' ready for operation while the other filter 5 is being operated. Some of the particulate contaminants may be driven out of the gas inlet and back into the contaminated gas stream. These particles will flow immediately to the operating filter 5 and be recollected there without passing through any valves.

Thus by operation of the valve 16 on the control gas supply to the vortex amplifier it is possible to switch from one filter to the next so that each filter in turn may be cleaned.

Figure 6:
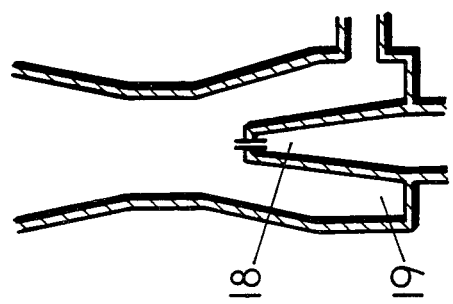
FIG. 6 shows an ejector.

A slight drawback with this arrangement is that the control nitrogen supply is cold and will therefore cool to some extent the contaminant-free gas passing into the vortex amplifier. Moreover if the gas is a fuel gas, it will dilute it and therefore reduce its calorific valve. This drawback can, if necessary, be minimised by use of an ejector associated with each vortex amplifier, one of which ejectors is shown in FIG. 6 to which reference is now made.

An ejector comprises a central nozzle 18 for supplying a gas at high pressure surrounded by a chamber 19 to which another gas is supplied at lower pressure. As the jet of high pressure gas emerges from the nozzle, the low pressure gas is entrained therein and brought to a higher pressure. The mixture of gas can then be fed to the tangential inlets of a vortex amplifier. It is possible to use three or four or sometimes higher than ten volumes of the low pressure gas to one volume of the high pressure gas to form the mixture.

Figure 2:
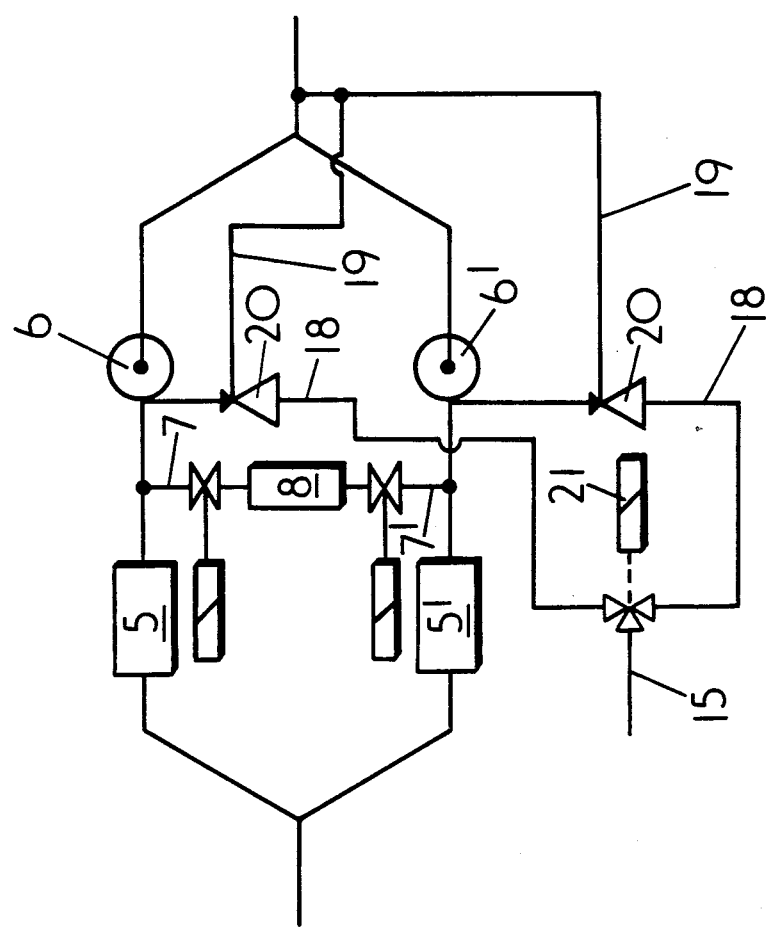
FIG. 2 shows diagrammatically a second embodiment of the present invention.

FIG. 2 to which reference is now made makes use of two ejectors 20, 20' in a system similar to that described with reference to FIG. 1. In this case, however, the pressurised nitrogen supply 15 is fed to the jet of one of the two ejectors 20, 20' by use of the valve 21. The annular chamber of each ejector 20, 20' is connected to the contaminant-free gas line, so that when the vortex amplifier is operated the gas which is fed into it comprises a mixture of contaminant free gas and nitrogen. Since the contaminant free gas will be at the same temperature and have the same calorific value as the gas entering the vortex amplifier, there will not be such a great cooling or dilution effect.

Figure 3:
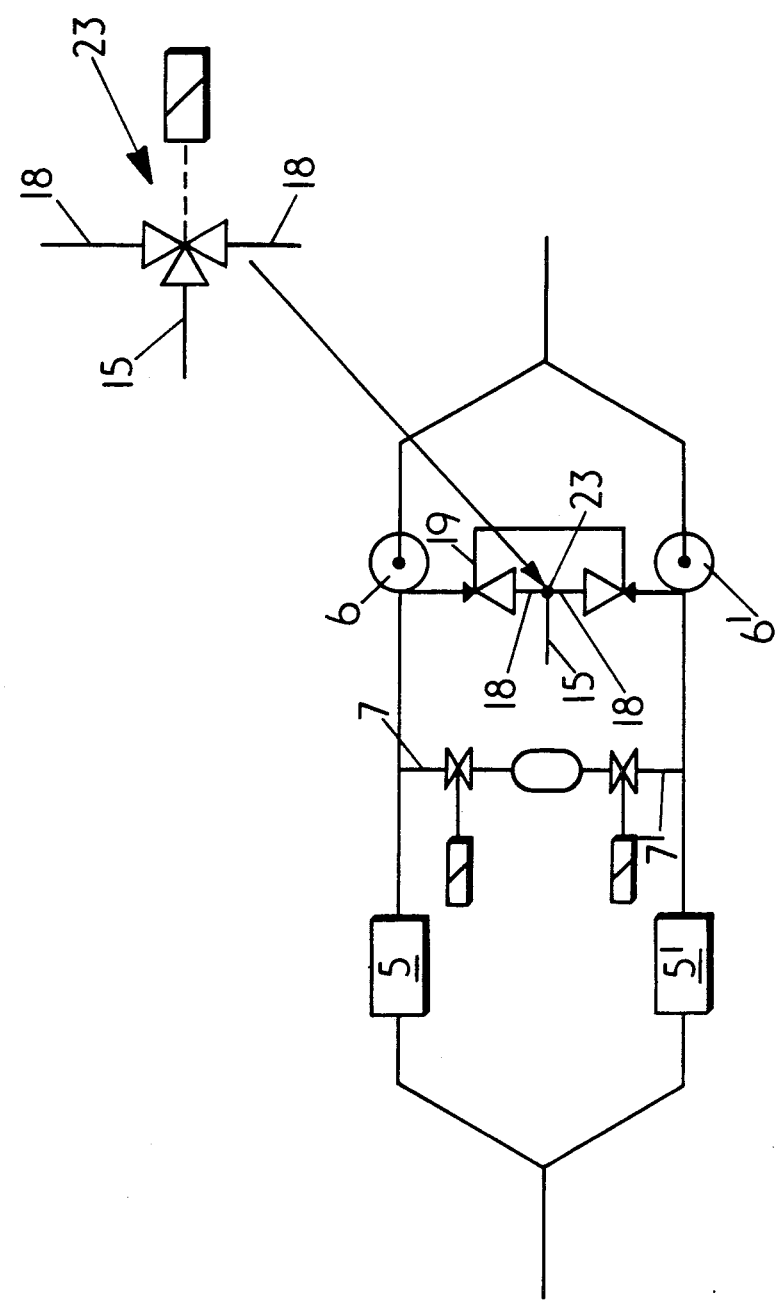
FIG. 3 shows diagrammatically a third embodiment of the present invention.
Figure 7:
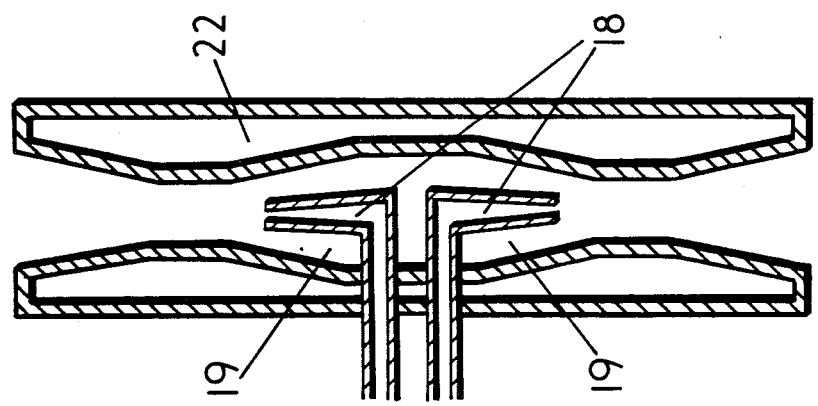
FIG. 7 shows a double jet ejector.

This arrangement has a drawback in that it needs a large amount of piping, which will need to be insulated if the gases used are hot. This can be obviated by the use of the system shown in FIG. 3 to which reference is now made. In this system, which is similar to the other two systems, a double nozzle ejector 22 is used in place of the two separate ejectors. Such an ejector is shown in FIG. 7 to which reference is now made. The supply of nitrogen is switched from one jet to the other by use of valve 23. The annular chambers 19 on either side of the ejector 22 are connected together so that when one vortex amplifier is being operated gas is being drawn out of the tangential inlet or inlets of the other vortex amplifier and through both chambers into the operating amplifier. This reduces greatly the amount of insulated piping needed, and results in a more compact arrangement for the switches. Moreover, the entrainment rate of flow from one vortex amplifier to the other by use of the double ejector may be increased by making the vortex amplifier with a small radius lip on its tangential inlet.

It will be seen that in any of the above systems contaminated gas never flows through the vortex amplifiers, thus avoiding corrosion, erosion and fouling problems, while ensuring that the filters may be cleaned efficiently.

In any of the above systems the contaminated gas may be a fuel gas produced by substituting a gasifier of known construction for the combustor 1.

What we claim is:

1. An improved hot gas cleaning system for removal of solid particles of mesh size 10 $\mu$m and lower, and aerosols from a hot gas stream, wherein a line for carrying hot gases including solids and aerosols, having had the majority of solids removed, is split into a plurality of lines, each one comprising;

a particle and aerosol collector to clean the gas including an associated cleaning means to clean the collector, and; a vortex amplifier, positioned in the stream of the particle and aerosol flow, which can, by use of control gas, be made to open or close the line to hot gas flow in which it is included, such closing of the line to hot gas flow allowing the particle and aerosol collector to be cleaned by its cleaning means whereby the whole system operates in such a manner that at any time only one line is closed to hot gas flow, while having its particle and aerosol collector cleaned, each collector being able to take the whole of the flow so that the total flow of hot gas is largely unaffected.

2. A system according to claim 1, in which each vortex amplifier is located upstream of the collector in the line in which it is included.

3. A system according to claim 1, in which each vortex amplifier is located downstream of the collector in the line in which it is included.

4. A system according to claim 1, and including means for supplying to each vortex amplifier an inert gas for controlling each vortex amplifier.

5. A system according to claim 1, in which each particle and aerosol collector is a granular bed filter.

6. A system according to claim 5, in which the collector cleaning means is a puff-back system.

7. A system according to claim 1, in which the means for supplying inert gas includes two gas inlets whereby the control gas to operate each vortex amplifier is a mixture of an inert gas and hot process gas that has passed through the cleaning system.

8. A system according to claim 7, in which the means for supplying the mixture to each vortex amplifier is an ejector.

9. A system according to claim 8, in which the ejector is a double nozzle ejector positioned between an adjacent pair of vortex amplifiers.

* * * * *